United States Patent
Öztürk et al.

(10) Patent No.: US 12,510,472 B2
(45) Date of Patent: Dec. 30, 2025

(54) ADULTERATION AND AUTHENTICITY ANALYSIS METHOD OF ORGANIC SUBSTANCES AND MATERIALS BY TERAHERTZ SPECTROSCOPY

(71) Applicant: BURSA TEKNİK ÜNİVERSİTESİ REKTÖRLÜĞÜ, Bursa (AR)

(72) Inventors: Turgut Öztürk, Sivas (AR); Adnan Fatih Dağdelen, Bursa (AR); Furkan Türker Saricaoğlu, Bursa (AR); Tuğba Şimşek, Bursa (AR); Hande Hayrabolulu, Bursa (AR)

( * ) Notice: Subject to any disclaimer, the term of this patent is extended or adjusted under 35 U.S.C. 154(b) by 206 days.

(21) Appl. No.: 18/547,186

(22) PCT Filed: Feb. 15, 2022

(86) PCT No.: PCT/TR2022/050129
§ 371 (c)(1),
(2) Date: Aug. 21, 2023

(87) PCT Pub. No.: WO2022/177534
PCT Pub. Date: Aug. 25, 2022

(65) Prior Publication Data
US 2024/0142372 A1    May 2, 2024

(30) Foreign Application Priority Data
Feb. 19, 2021    (TR) ............... 2021/002360

(51) Int. Cl.
*G01N 21/3586*    (2014.01)
*G01N 21/3577*    (2014.01)

(52) U.S. Cl.
CPC ..... *G01N 21/3586* (2013.01); *G01N 21/3577* (2013.01)

(58) Field of Classification Search
CPC ........... G01N 21/3586; G01N 21/3577; G01N 21/552; G01N 2201/129
See application file for complete search history.

(56) References Cited

U.S. PATENT DOCUMENTS

| | | | |
|---|---|---|---|
| 2008/0014580 A1* | 1/2008 | Alfano ............... | G01N 21/3586 435/6.19 |
| 2008/0165364 A1 | 7/2008 | Zhao et al. | |
| 2010/0001189 A1* | 1/2010 | Federici ............... | H04B 10/00 250/353 |

(Continued)

FOREIGN PATENT DOCUMENTS

| | | |
|---|---|---|
| DE | 102010050595 A1 | 5/2012 |
| EP | 3087371 B1 | 4/2020 |
| JP | 2012117966 A | 6/2012 |

OTHER PUBLICATIONS

International Search Report for corresponding PCT/TR2022/050129 dated Jun. 10, 2022.

(Continued)

*Primary Examiner* — Chih-Cheng Kao
(74) *Attorney, Agent, or Firm* — Egbert, McDaniel & Swartz, PLLC

(57) ABSTRACT

Disclosed are a THz-TDS system (S), a sample preparation and chemometric-based analysis method that enables the determination of quality control, adulteration and authenticity of all organic substances and materials, especially samples with high water content.

4 Claims, 2 Drawing Sheets

(56) References Cited

U.S. PATENT DOCUMENTS

Figure 1:
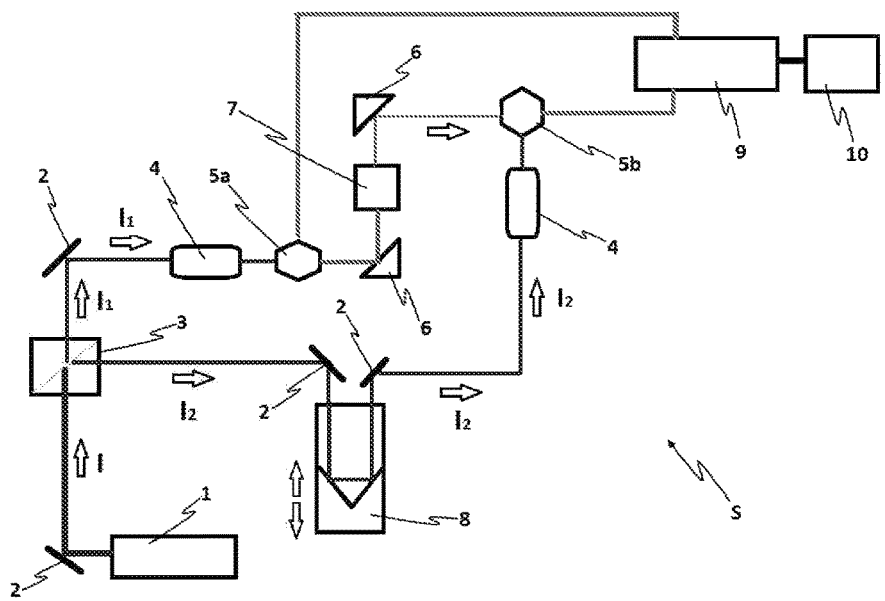

| | | |
|---|---|---|
| 2011/0133090 A1 | 6/2011 | Demers et al. |
| 2016/0139044 A1* | 5/2016 | Richter .................. G01N 33/00 250/339.01 |
| 2021/0298594 A1* | 9/2021 | Ke ......................... G16H 50/30 |

OTHER PUBLICATIONS

Written Opinion of the International Searching Authority for corresponding PCT/TR2022/050129 dated Jun. 10, 2022.

\* cited by examiner

ADULTERATION AND AUTHENTICITY ANALYSIS METHOD OF ORGANIC SUBSTANCES AND MATERIALS BY TERAHERTZ SPECTROSCOPY

TECHNICAL FIELD

The invention relates to the THz-TDS system, a sample preparation and chemometric-based analysis method that enables the determination of quality control, adulteration and authenticity of all organic substances and materials, especially samples with high water content.

PRIOR ART

Many analyzes are carried out for the control of raw materials, auxiliary substances, additives and wastes in many sectors, especially in food, feed and pharmaceuticals. These analyzes for quality control and detection of adulteration are expected to meet many of the important aspects such as precision, accuracy, cost, speed and ergonomics. However, developing an analysis method that meets all of these expectations is a very difficult and laborious process.

When analysis methods currently used are examined, it is observed that the analytes response to electromagnetic radiation (absorption, emission, scattering, refraction, diffraction, fluorescence, motion), and its reaction to electricity (potential, charge, current, resistance) is based on the measurement of some characteristic features such as thermal, mass-charge ratio, radioactivity, etc. Many of these methods are good in terms of precision and accuracy, although they are published as a standard method, they do not meet the expectations sufficiently in terms of speed, analysis cost, ergonomics and non-destructive properties.

Considering the analysis methods that measure the reaction of the analyte to the beam in the electromagnetic spectrum, it is seen that it is the measurement method with the highest potential to meet all expectations. Terahertz (THz) waves in the electromagnetic spectrum are called electromagnetic waves, which generally vary in the range of 0.1-10 THz electromagnetic spectrum and whose limits are not fully determined. Although these electromagnetic waves are located in a very wide region, systems based on THz waves stand out as a technology open to innovations and new research areas. Today, THz waves have many usage areas such as health, defense, food, pharmaceutical industry, imaging, communication, internet of things. The most important reason for the great development in THz technology in recent years is the developments in electronic and optical technologies.

The THz region can be named differently such as sub-mm, T-rays, Terahertz waves (Nagatsuma et al., 2016; Pawar et al., 2013; Jones et al., 2006; Verme 2007; Akkas, 2018).

THz waves passing through most materials such as plastic, cardboard, fabric, are absorbed in water and water vapor, and are reflected by metals. These waves are harmless compared to X-rays due to their non-ionizing feature of biological tissues and can be used for medical imaging, although they do not cause any chemical reaction. THz wave vibrate the molecules of the substance it passes through at certain frequencies and it becomes difficult for THz waves to pass through these molecules. This creates a spectral fingerprint that helps identify the material.

THz time-domain spectroscopy (TDS) technique has been used in the fields of medical diagnosis, defense and security, safety, and quality control in medicine and food, and successful results have been obtained so far. The THz-TDS system both generates and detects THz signals in a coherent and time-triggered method using a femto-second laser. This system has advantages over traditional far-IR (FTIR) or conventional THz systems with its high signal-to-noise ratio (SNR). While only the amplitude is obtained in traditional THz methods, the amplitude and phase information of the spectral components of the THz signal are obtained with the THz-TDS method. Thus, the refractive index of the studied sample and its complex dielectric and magnetic properties are determined. The THz-TDS system has no radiation risk. Since it does not ionize biological molecules, it does not harm living organisms and is transparent to non-polar materials such as paper, plastic, ceramics. In addition, many chemical materials have unique fingerprint signals in this region.

THz-TDS systems have two optical arms, generation and detection, both of which are in the same experimental setup. Ultra-fast lasers are used as the beam source and the incoming beam is divided into two branches. One of them produces THz radiation. The THz waveform can be obtained as a function of time while scanning the sensory beam with interferometric steps. The first measurement of the THz waveform is used as a reference. When the measurements are examined under the fourier transform (FT), spectroscopic information about the sample is revealed. In general, the time shift of the main THz peak is related to the refractive index and the change in amplitude is related to the power absorption of the sample. This is the direct result of both amplitude and phase measurements of the THz electric field (Zhang and Xu, 2010).

The schematic view of the THz-TDS system (S) is given in FIG. 1. In the known technique, the light beam (I) emerging from the beam source (1) is split into two with the help of the beam splitter (3). The rays (I), are directed by reflective mirrors (2). The beam (I), which follows two paths called the generation path ($I_1$) and the detector path ($I_2$), are focused on the photoconductive antennas (THz emitter antenna (5a) and THz detector antenna (5b)) with the help of the objective lens (4). The rays (I) emanating from the THz emitter antenna (5a) are directed to the sample holder (7) with the help of parabolic mirrors (6). The signals released as a result of the interaction with the sample beam (I) and the beam coming from the detection path ($I_2$) are also collected at the THz detector antenna (5b). With the aid of the lock-in amplifier (9), the relationship between the excitant beam intensity and the THz electric field is obtained as a function of the delay time.

Figure 2:
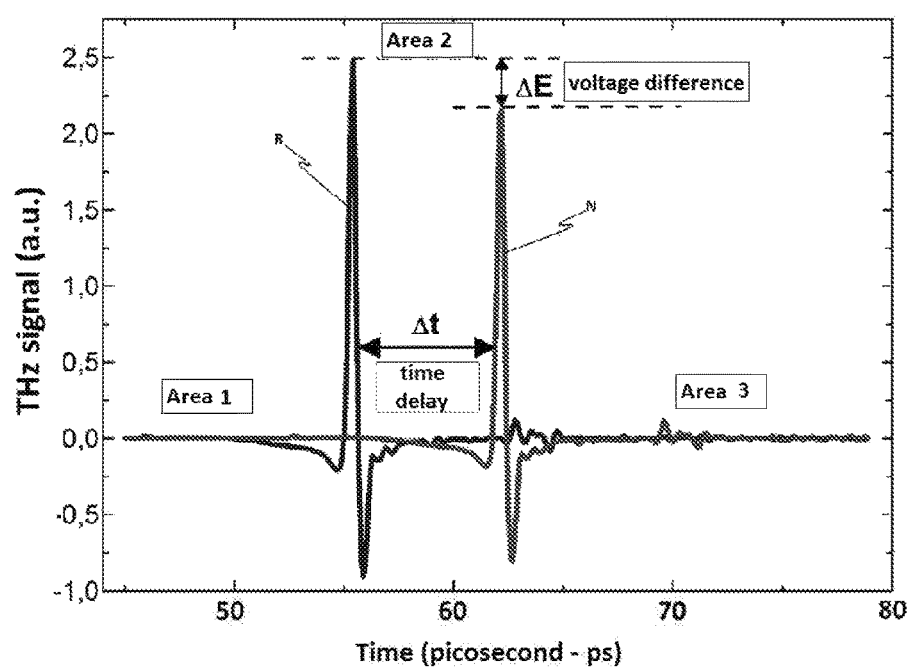
Figure 3:
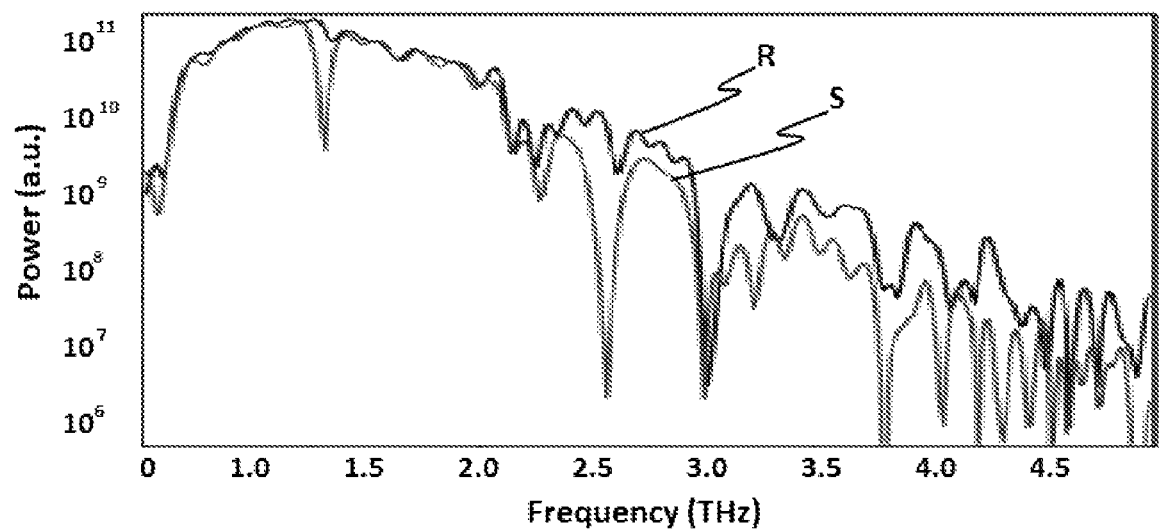

In FIG. 2, the graph of the THz signal (pulse) obtained from the THz-TDS system (S) is illustrated. In the graph given in FIG. 2, area 2 corresponds to the main THz signal. Area 1 indicates the noise level and is used to calculate the noise since the THz signal has not yet been measured. Area 3 represents oscillations in the electric field due to the absorption of the THz field. Again, in the graph given in FIG. 2, the peaks of the reference (R) and the sample (S) and the voltage change and time delay that can be measured in line with these peaks can be calculated. In FIG. 3, the power spectrum of the THz signal of the reference (R) and the sample (S) is given.

In the current technique, reflection type measurement, transmission type measurement and attenuated total reflection (ATR) type measurement methods as alternatives to THz-TDS system (S) are preferred for different purposes as they give positive results for their usage purposes. For example, reflection type measurement is used to determine sample thickness and deformation on pills in the pharmaceutical industry as well as imaging processes, while transmission type measurement is frequently preferred in material characterization and plays an important role in detecting the determinant fingerprint in the THz frequency domain by also analyzing liquids in the form of thin films (100 µm). The ATR method, which has recently been used as an alternative to these two measurement systems, is mostly used in the analysis of liquids.

During the preliminary patent research, some documents related to the subject were found. One of them is patent application number WO2020104011A1. The invention relates to a method for classifying a sample by means of a sample scanner. The sample scanner includes at least one terahertz source for generating a terahertz primary radiation, a detection unit for detecting a terahertz secondary radiation originating from the sample, and an analysis module.

Patent application JP2012117966A describes a method developed for detecting organic matter suspended in a medium using terahertz spectroscopy. Mentioned organic substance is preferably a sugar, more preferably a monosaccharide or a disaccharide. It is stated in the application that the medium containing the organic material can be dried and preferably most of the water is removed from the sample by the drying process.

In the patent application numbered EP3087371B1, a method for the classification and grading of seeds is mentioned. The invention relates to method for classifying and/or grading seeds using terahertz domain radiation, for example by terahertz time domain spectroscopy.

In the prior art, there are also difficulties in detecting the desired substances in the sample due to the absorption of THz waves by water in THz spectroscopy. Therefore, in order for samples with high water content to be analyzed with this technology, it is necessary to remove the water in the environment or take measures to reduce its effect. In addition to all these, statistical and mathematical methods which enable reaching the accurate information or revealing the hidden information from the data collected as a result of chemical analyzes called chemometrics. Therefore, it is necessary to develop analysis methods to enable the use of THz technology in samples with high water content such as food.

Consequently, due to the aforementioned problems and deficiencies, there has been a need to make an innovation in the related technical field.

PURPOSE OF THE INVENTION

The present invention relates to the adulteration and authenticity analysis method of organic substances and materials by terahertz spectroscopy, which meets the above-mentioned requirements, eliminates all disadvantages and brings some additional advantages.

The purpose of the invention is to introduce a sample preparation and chemometric-based analysis method that enables the determination of quality control, adulteration and authenticity of all organic substances and materials, especially samples with high water content, by terahertz (THz) spectroscopy.

The purpose of the invention is to develop an analysis method in which measurements are made in the THz electromagnetic region and the reliability of the measurement results with chemometric calculations is increased.

The purpose of the invention is to provide a simple, practical, fast and non-destructive sample preparation.

The purpose of the invention is to reduce the analysis time and cost.

The purpose of the invention is to create an analysis method of which sensitivity and accuracy is at least as good as known analysis methods.

One purpose of the invention is to present an ergonomic analysis method with a high potential for widespread use and application.

One purpose of the invention is to determine the origin of the sugar used in beverages with a simple, fast, accurate, and non-destructive method developed.

One purpose of the invention is to develop and use specific compounds that will create a complex with the analyse to provide more sensitive and accurate results.

In order to fulfill the above-described purposes, the invention includes the process stages of:
a. The beam coming out of the beam source is split into two by arriving at the beam splitter by means of fiber cables used to reduce beam losses,
b. the beam, which follows two paths, called the generation path and the detector path, focuses on the THz emitter antenna and the THz detector antenna with the help of the objective lens,
c. applying an optical delay line in the detector path beam path using a moving stage to change the path length,
d. The rays coming from the generation path beam path and out of the THz emitter antenna are directed to the sample holder with the help of parabolic mirrors,
e. sending the signals released as a result of the interaction of the sample with the beam and the beam coming from the detector path from the THz detector antenna to the lock-in amplifier, it is an analysis method that enables the determination of quality control, adulteration and authenticity of all organic substances and materials, especially samples with high water content, with the THz-TDS system, which includes the processing steps above;

Its feature is to reduce the losses in THz beam caused by the high moisture content of organic samples, reducing the thickness of the sample before the process step a and placing this sample between plastic layers that do not cause any loss in the THz beam, adding the analytes to be detected in the sample and the substances that will form a complex to the sample against the THz beam, making it more sensitive, removing the water in the sample by heat, electricity, freezing, filtration, extraction, absorption, crystallization or magnetic beam techniques, in the e process step, the signal information collected in the locking amplifier is analyzed with the help of the data processing program in the computer, and the refractive index of the sample is calculated with formula 1, the frequency-dependent calculation of the refractive index with formula 2 and the absorption with formula 3.

The structural and characteristic properties of the invention and all of its advantages shall be more clearly understood by means of the detailed description provided below and therefore if an evaluation is to be carried out, it needs to be done so, and by taking into consideration this detailed description.

FIGURES DESCRIBING THE INVENTION

FIG. 1: It is the schematic view of the THz-TDS system
FIG. 2: It is the graph of the THz signal (pulse) obtained from the THz-TDS system.
FIG. 3: It is the power spectrum of the reference and sample THz signal The drawings don't have to be scaled according to the original product and some details may have been omitted to clearly describe the invention. Parts that are identical to a great extent or that have equivalent functions have been represented with the same reference number.

DESCRIPTION OF THE PART REFERENCES

1. Beam source
2. Reflective mirror
3. Beam splitter
4. Objective lens
5a. THz emitter antenna
5b. THz detector antenna
6. Parabolic mirror
7. Sample holder
8. Optical delay
9. Lock-in amplifier
10. Computer
$I_1$. Generation path
$I_2$. Detector path
I. Ray
N. Sample
R. Reference
S. THz-TDS system

DETAILED DESCRIPTION OF THE INVENTION

In this detailed description, adulteration and authenticity analysis method of organic substances and materials by terahertz spectroscopy have been described only to provide further understanding of the invention, without intending to have a limiting effect on the invention.

The invention relates to the THz-TDS system (S), a sample preparation and chemometric-based analysis method that enables the determination of quality control, adulteration and authenticity of all organic substances and materials, especially samples with high water content.

Sample preparation method to reduce losses in THz beam caused by high moisture content of organic samples includes the process steps of;

Reducing sample thickness to reduce the negative impact of water and placing this sample between the plastic layers that do not cause any loss in the THz beam, Making the sample more sensitive to THz radiation by adding substances that will form complexes with the analytes to be detected in the sample, Removing the water in the sample with heat, electricity, freezing, filtration, extraction, absorption, crystallization or magnetic beam techniques.

THz-TDS system (S);

The beam (I) coming out of the beam source (1) being split into two by arriving at the beam splitter (3) by means of fiber cables used to reduce beam losses, The beam following the two paths named generation path ($I_1$) and detector path ($I_2$) The beam (I) focusing on THz emitter antenna (5a) and THz detector antenna (5b) with the help of objective lens (4), Implementation of an optical delay line (8) in the detection path ($I_2$) beam path using a mobile stage to change the path length, Directing the beams (I) coming from the generation path ($I_1$) beam path and coming out of the THz emitter antenna (5a) to the sample holder (7) with the help of parabolic mirrors (6), Sending the signals released as a result of the interaction of the sample with the beam (I) and the detector path ($I_2$) of the beam (I) from the THz pick-up antenna (5b) to the lock-in amplifier (9), Performing frequency-dependent calculations of the refractive index, absorption and refractive index of the sample by analyzing the signal information (power spectrum of the reference (R) and the THz signal of the sample (S) and the THz signal graph) with the help of the lock-in amplifier (9) with the help of the data processing program on the computer, In the THz-TDS system (S), the rays (I) coming out of the beam source (1) are directed by reflective mirrors (2).

The time difference between the two signals obtained at the THz emitter antenna (5a) and the THz detector antenna (5b) gives the refractive index, and the difference between the amplitudes gives the power absorption of the sample. While calculating the refractive index of the analyzed sample, formula 1 is used, while calculating the refractive index based on frequency, formula 2 is used, and for calculating absorption, formula 3 is used.

$$n = 1 + \frac{c \cdot \Delta t}{d} \qquad \text{Formula 1}$$

In formula 1, c is the speed of light ($3 \times 10^{11}$ mm/s), d is the sample thickness (mm), and $\Delta t$ is the time difference (s).

$$n = 1 + \frac{c}{2\pi f d} \cdot (\varphi_{sample} - \varphi_{reference}) \qquad \text{Formula 2}$$

In formula 2, f denotes frequency (Hz) and $\varphi$ phase (rad).

$$\text{Absorption} = -\frac{1}{d} \ln\left(\frac{\text{power}_{sample}}{\text{power}_{reference}}\right) \qquad \text{Formula 3}$$

Within the scope of the invention, numerical data belonging to characteristic spectra (power spectrum of the reference and sample THz signal and THz signal graph) obtained from the THz-TDS system (S) are processed with chemometric data analysis methods (applying formulas 1, 2 and 3) and converted into meaningful results. Since these results belong to the sample, they are used for the quality control, adulteration and authenticity detection.

The Techniques to be Used as a Chemometric-Based Analysis Method within the Scope of the Invention are as Follows Because the raw spectra obtained as a result of spectroscopic analyzes are very complex, they can be evaluated using chemometric data analysis methods. Chemometric models are mathematical and statistical techniques that distinguish different groups from each other, exclude unnecessary data, and reveal the desired information. For this purpose, the multivariate data analysis methods used in qualitative data analysis are as follows:

Principal Component Analysis (PCA),
Partial Least Squares-Discriminant Analysis (PLS-DA),
Partial Least Squares Regression Analysis (PLSR),
Principal component regression analysis (PCR)
Multiple linear regression analysis (MLR)

Three basic error values are used to compare the performances of the mentioned chemometric methods. These are the Root Mean Squared Error of Calibration (RMSEC) of the calibration model, the Root Mean Squared Error of Cross-Validation (RMSECV) of the cross-validation model, and Root Mean Squared Error of Prediction (RMSEP) values. All these values are calculated over the root Mean Squared Error value and the equation in formula 4 is used.

$$RMSE = \sqrt{\sum_{i=1}^{n} \frac{(c_i - \hat{c}_i)^2}{n}}$$ Formula 4

In Formula 4, the RMSE value is one of the quality parameters that expresses the difference between the value predicted by the model (ĉi) and the actually measured value (ci). In the above equation; n indicates the number of concentrations studied. Formula 4, is used to calculate three basic error values (RMSEC, RMSECV and RMSEP) to be used in comparing the performances of chemometric methods (PCA, PLS-DA, PLSR, PCR, MLR).

Thanks to the sample preparation and chemometric-based analysis method developed with the invention, a fast, economical, accurate, sensitive, non-destructive, practical, and ergonomic method has been provided alternative to the analysis methods used to determine quality and adulteration.

The invention claimed is:

1. A method for determining quality control and adulteration and authenticity of an organic substance having a water content, the method comprising:
   placing an organic sample between plastic layers;
   adding analytes to be detected in the organic sample so as to form a complex to the organic sample;
   removing the water from the organic sample by at least one of heat, electricity, freezing, filtration, extraction, absorption, crystallization and magnetic beam;
   splitting a beam from a beam source into a pair of beams by a beam splitter with fiberoptic cables;
   focusing the beam so as to follow a generation path on a THz emitter antenna and a detection path on a THz detector antenna, the focusing being through an objective lens;
   implementing an optical delay by using a mobile stage on a beam line on the detection path so as to change a path length;
   detecting the beam from the generation path out of the THz emitter antenna toward a sample holder by a parabolic mirror, the sample holder containing the organic substance;
   transmitting a signal from an intersection of the organic substance in the sample holder with the beam, the beam being from the detection path from the THz detector antenna toward a lock-in amplifier calculating a refractive index of the organic sample in accordance with the following formula:

$$n = 1 + \frac{c \cdot \Delta t}{d}$$

calculating the refractive index based on frequency in accordance with the following formula:

$$n = 1 + \frac{c}{2\pi f d} \cdot (\varphi_{sample} - \varphi_{reference})$$

calculating an absorption by analyzing the signal collected by the lock-in amplifier by a data processing program, the calculating being in accordance with the following formula:

$$\text{Absorption} = -\frac{1}{d}\ln\left(\frac{\text{power}_{sample}}{\text{power}_{reference}}\right)$$

wherein C is a speed of light, d is a thickness of the organic sample, $\Delta t$ is a time difference between a pair of signals obtained at the THz emitter antenna and the THz detector antenna, f is frequency and $\varphi$ denotes phase.

2. The method of claim 1, further comprising:
   analyzing a principal component of the organic sample by a partial least squares discriminant analysis.

3. The method of claim 1, further comprising:
   analyzing a principal component of the organic sample by a partial least squares by a principal component regression analysis.

4. The method of claim 1, further comprising:
   analyzing a principal component of the organic sample by a partial least squares by a multiple linear regression analysis.

* * * * *